Figure 1:
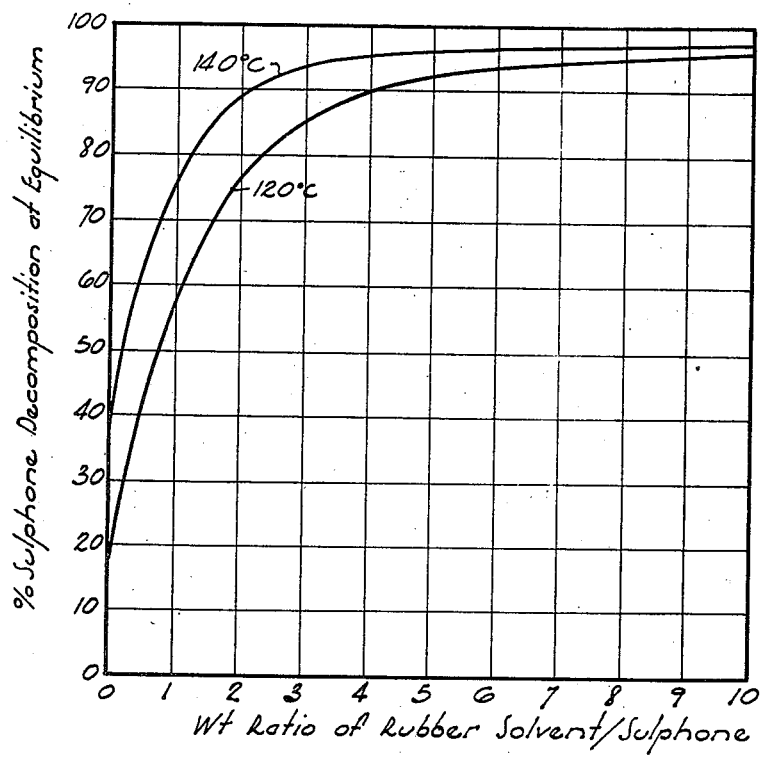

Patented Sept. 4, 1945

2,384,376

UNITED STATES PATENT OFFICE 2,384,376

RECOVERY OF SULPHUR DIOXIDE AND DIOLEFINS FROM SULPHONES

George M. Hebbard, Midland, Mich., assignor to The Dow Chemical Company, Midland, Mich., a corporation of Michigan Application November 3, 1941, Serial No. 417,673

7 Claims. (Cl. 23—178)

This invention concerns an improved method of regenerating and recovering sulphur dioxide and a conjugated diolefin from a corresponding sulphone.

In a known method for separating conjugated diolefins from cracked-oil gas or other mixtures of the same with low boiling paraffinic, olefinic and/or acetylenic hydrocarbons, the hydrocarbon mixture is liquefied and treated at superatmospheric pressure in a bomb or autoclave with liquid sulphur dioxide to effect reaction of the latter with the diolefin and form a sulphone. Excess sulphur dioxide and the unreacted hydrocarbons are removed, usually by releasing the pressure and vaporizing the same from the sulphone product. The latter is thermally decomposed at atmospheric pressure or thereabout to form a gaseous mixture of sulphur dioxide and the diolefin, from which the sulphur dioxide is removed, usually by scrubbing with water. Because of the corrosive action of the resultant sulphurous acid on usual structural metals and because of the low solubility of sulphur dioxide in water, expensive corrosion-resistant scrubbing apparatus of large size is required. The heat required to vaporize and recover sulphur dioxide from the dilute aqueous sulphurous acid solution adds considerably to the cost of the recovered products.

In a co-pending application, Serial No. 290,864, of G. W. Hooker et al., it is shown that liquefied organic sulphones are exceptionally effective solvents for sulphur dioxide and that by using a liquefied sulphone to extract sulphur dioxide from such mixture with a diolefin the foregoing disadvantages inherent in the use of water as the extractant are avoided. In another application of G. W. Hooker et al., Serial No. 417,676, and filed concurrently herewith, it is shown that sulphur dioxide may even more effectively be removed from mixtures thereof with gaseous or low boiling hydrocarbons by simultaneously treating the mixture with a liquefied sulphone and a liquid fraction of petroleum, whereby the sulphur dioxide is absorbed by the sulphone and the low boiling hydrocarbon is absorbed by the liquid petroleum fraction to form two extracts which are immiscible in one another. Such extraction is preferably carried out in continuous manner in an extraction tower under a pressure sufficient to liquefy the entire extraction mixture and with the extractants flowing countercurrent to one another, since the productive capacity of the extraction apparatus is greatest when operating under these conditions.

However, the reaction for the dissociation of a sulphone of a diolefin is an equilibrium reaction, as illustrated by the following equation for the thermal decomposition of the sulphone of butadiene:

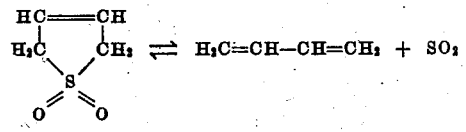

At a temperature sufficient to cause the reaction, dissociation of the sulphone is favored at low pressures, e. g. at atmospheric pressure or thereabout, whereas pressures sufficient to liquefy the mixture favor reaction between the sulphur dioxide and the diolefin to form the sulphone. For this reason, it has heretofore been impractical to decompose the sulphone at a pressure sufficient to liquefy the resultant mixture and, as hereinbefore pointed out, the dissociation reaction has been carried out at atmospheric pressure or thereabout and extraction of sulphur dioxide from the resultant sulphur dioxide and diolefin mixture has likewise been carried out at approximately atmospheric pressure. Accordingly, the extraction could not satisfactorily be carried out at the liquefying pressures which, according to the aforementioned Hooker et al. application, Serial No. 417,676, are most favorable to rapid and efficient extraction.

It is an object of this invention to provide a method for the recovery of sulphur dioxide and a diolefin from a sulphone, whereby the latter may satisfactorily be dissociated into the diolefin and sulphur dioxide while at a pressure sufficient to liquefy the mixture and the sulphur dioxide and diolefin thus formed may at the same time be separated from one another so as to inhibit or prevent recombination into the sulphone. Other objects will be apparent from the following description of the invention.

I have discovered that the equilibrium between a sulphone of a diolefin and its dissociation products which exists at a pressure sufficient to liquefy the mixture may be upset and formation of the sulphur dioxide and diolefin be favored by carrying the decomposition out under such pressure in the presence of an organic liquid which is a good solvent for one of the products of the decomposition, preferably the diolefin, and is a nonsolvent or only a poor solvent for the other decomposition product, e. g. the sulphur dioxide. By carrying the decomposition out in the presence of such organic liquid, not only is decomposition of the sulphone into sulphur dioxide and the diolefin favored, but also the products of the reaction are effectively separated from one another while maintaining the mixture under pressure.

Figure 2:
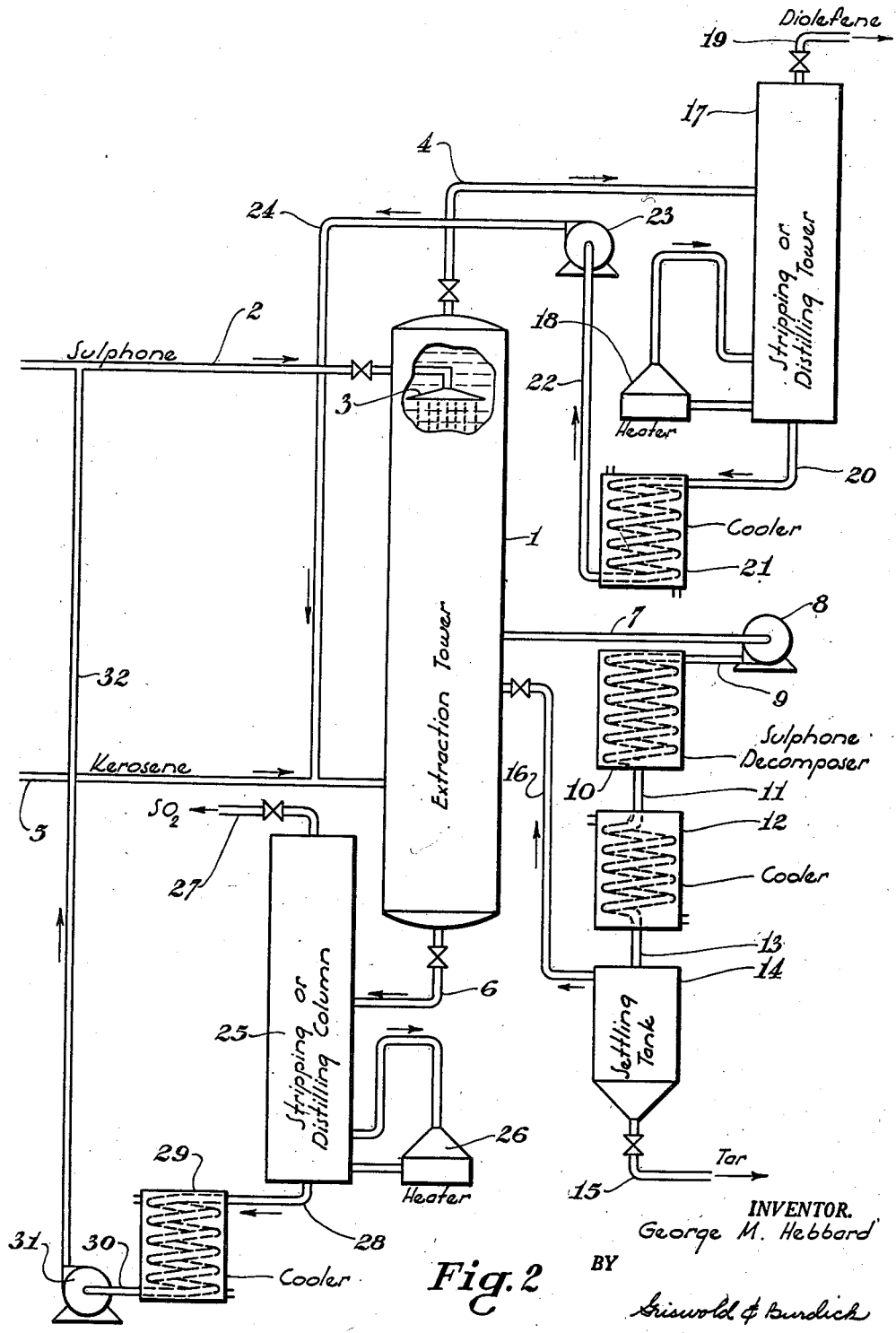
Figure 3:
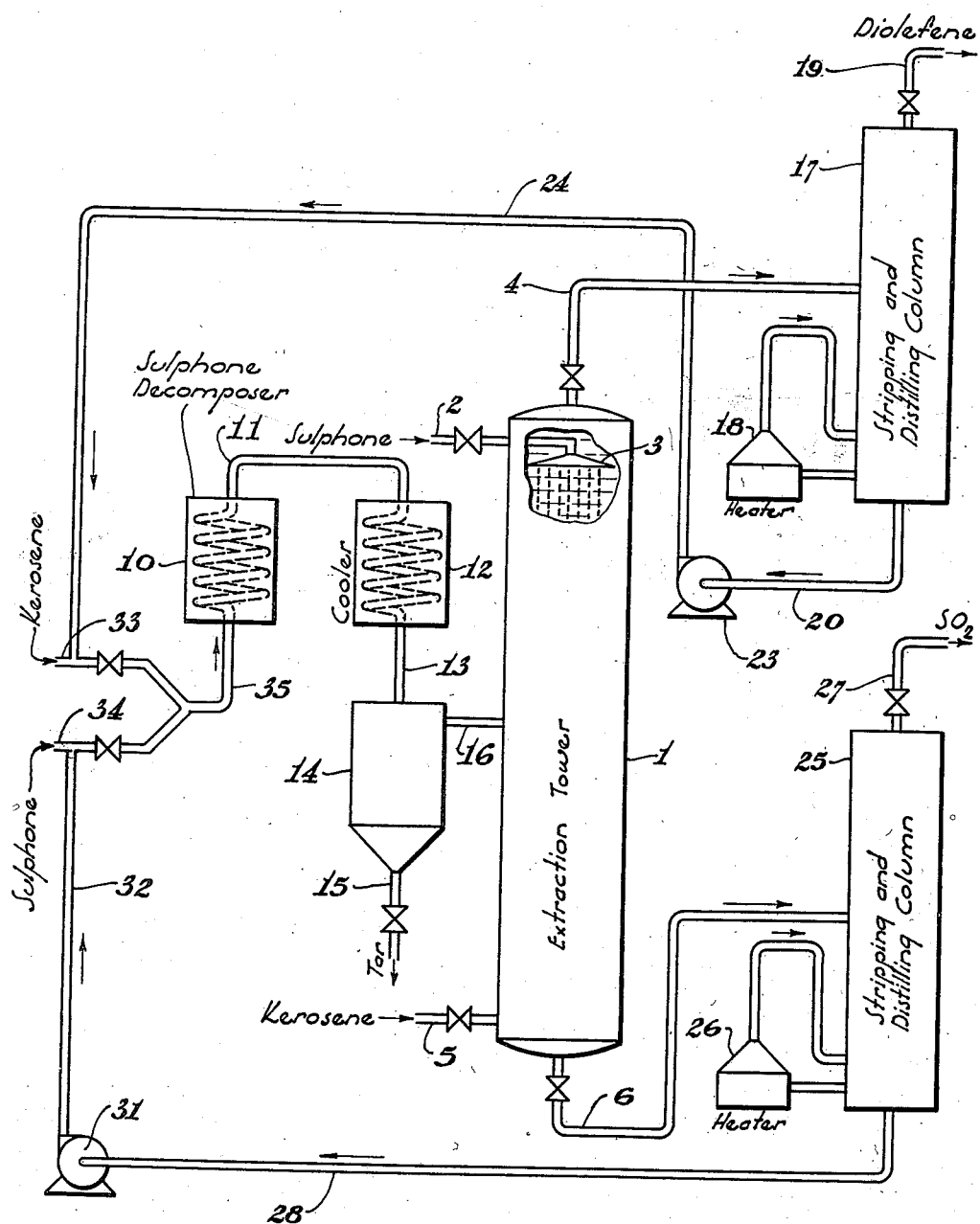

In the accompanying drawings, Fig. 1 is a graph showing the changes in the equilibrium between the sulphone of butadiene and its decomposition products which are brought about by the additions of increasing proportions of a normally liquid paraffin hydrocarbon while heating the mixture at a liquefying pressure and at the respective temperatures indicated. Each curve of the graph shows such shifts in the equilibruim at a given temperature. Fig. 2 of the drawings is a diagrammatic sketch showing one of the various arrangements of apparatus suitable for use in practicing the invention and indicating the flow of materials through the apparatus. Fig. 3 is a diagrammatic sketch showing another suitable arrangement of apparatus and indicating the flow of materials through the same.

The experiments upon which the curves of the graph in Fig. 1 are based were each carried out by heating the sulphone of butadiene-1.3 together with the indicated amount of a liquid petroleum fraction known as "rubber solvent" to the given temperature in a bomb under a pressure sufficient to maintain the entire mixture liquid. After heating under said conditions for a time sufficient to attain equilibrium between the sulphone and its dissociation products, the per cent by weight of the sulphone initially employed which had been dissociated into sulphur dioxide and butadiene was determined. The vertical axis of the graph gives the proportion of sulphone which had been dissociated, expressed as per cent by weight of the sulphone initially employed, and the horizontal axis gives the ratio by weight of rubber solvent to sulphone in the mixture prior to heating. It may be mentioned that "rubber solvent" boils at temperatures between 46.5° and 130° C. at atmospheric pressure. It consists for the most part of paraffinic hydrocarbons, but contains about 4 per cent by weight of unsaturated aliphatic hydrocarbons and about 4 per cent of aromatic hydrocarbons.

In Fig. 2 the numeral 1 designates an extraction tower which is provided near its upper end with a valved inlet 2 which connects with a spray head or nozzle 3, situated inside of the tower. Tower 1 is also provided near its top with a valved outlet 4. Near the lower end of tower 1 is a valved inlet 5 and also a valved outlet 6. A line 7 from a point near the midsection of tower 1 connects with a pump 8, which in turn is connected by line 9 with a heater 10, herein referred to as the "sulphone decomposer." The sulphone decomposer may be provided with usual means for passing a heating fluid about a coil, as indicated in the drawings, or it may be heated in other usual ways, e. g. electrically. A line 11 connects the sulphone decomposer 10 with a usual cooler 12, which in turn is connected by line 13 with a settling tank 14. The latter is provided at its bottom with a valved drain 15. A valved line 16 leading from the settling tank 14 connects with the tower 1 near the midsection of the latter and preferably at a point below that at which line 7 connects with the tower. The outlet 4 from tower 1 connects with a column 17 at a point near the midsection of the column. The column 17 may be provided near its lower end with a usual heater 18 having suitable connecting lines, as indicated in the drawings, or may be heated in other usual ways. The column 17, which may be used as either a stripping or a distilling column, is provided near its top with an outlet 19 which may be valved as indicated, although such valve is not essential. When the column is to be employed as a distilling column, usual means, not shown, may be provided for return of a portion of the distillate to the column as reflux material. An outlet line 20 leads from the lower end of column 17 to a usual cooler 21 from which a line 22 leads to a pump 23. The latter is connected by line 24 to the inlet line 5 to the tower 1. The valved outlet line 6 from the lower end of tower 1 connects with a stripping or distilling column 25, which may be heated in any usual way, e. g. by the heater 26, as indicated. The column 25 is provided near its upper end with an outlet 27 which may be valved, as indicated, although this is not essential. An outlet line 28 from the lower end of column 25 connects with a usual cooler 29 which in turn is connected by line 30 to a pump 31. The latter is connected by line 32 with the inlet line 2 to the tower 1.

Except for the added valved inlets 33 and 34 and the line 35 with which they connect, the apparatus shown in Fig. 3 is the same as the correspondingly numbered apparatus shown in Fig. 2. The differences in arrangement of the apparatus of Fig. 3 from that shown in Fig. 2 will be apparent from the drawings. Other forms and arrangements of apparatus suitable for use in practicing the invention will be apparent.

The invention may be practiced in batchwise manner, if desired, in which case a sulphone of a diolefin, e. g. a sulphone of butadiene-1.3, isoprene, or of 2.3-dimethyl-butadiene-1.3, etc., and a selective solvent for one of its decomposition products (preferably the diolefin) are heated in a bomb or autoclave to a reaction temperature usually between 110° and 150° C., and preferably between 120° and 140° C. at a pressure sufficient to maintain the mixture in liquid form. Somewhat lower or higher temperature may sometimes be employed. The pressure required varies widely, depending on the extent of the decomposition reaction and the kind and proportion of solvent present, but usually is 80 pounds or more per square inch. The selective solvent used is a normally liquid saturated hydrocarbon, preferably of the paraffin series, or a mixture of such hydrocarbons. It is selected so as to have a boiling point different from, and preferably at least 20° C. higher than, that of the diolefin to be produced, in order that absorbed diolefin may be separated without difficulty from the same. The solvent is preferably free, or nearly so, of unsaturated or aromatic hydrocarbon ingredients, since the latter are better solvents for sulphur dioxide than are the saturated hydrocarbons. However, the presence of such undesirable ingredients in amounts less than 20 per cent by weight may be tolerated. Examples of suitable selective solvents are normally liquid paraffinic hydrocarbons such as hexane, octane, or decane and liquid fractions of petroleum such as gasoline, naphtha, ligroin, or kerosene, etc. The presence of as little as 0.2 part by weight of such solvent per part of sulphone is sufficient to increase markedly the proportion of sulphone which may be dissociated in liquid phase at a given temperature, and the extent of the reaction increases further as the proportion of solvent is increased to between 2 and 5 parts per part of sulphone. In practice one part or more, preferably between 2 and 6 parts, of the solvent is used per part of sulphone. The solvent may, of course, be used in much larger proportions without detriment. The reaction is usually complete after from 5 to 30 minutes of heating, but the period required for the reaction to reach the equilibrium condition may be shorter or longer depending upon the actual temperature of the decomposition mixture.

The reacted mixture is either centrifuged to separate the two phases thereof, or is permitted to settle and form distinct layers which are separated. The bottom layer obtained by settling of the mixture consists for the most part of a solution of sulphur dioxide and undecomposed sulphone. The sulphur dioxide may be vaporized, e. g. by raising the temperature and/or lowering the pressure, and be recovered in anhydrous form. The residual sulphone may, of course, be decomposed as above described to produce additional quantities of sulphur dioxide and the diolefin. The upper layer consists for the most part of a solution of the diolefin and the organic solvent. The diolefin is vaporized therefrom, leaving the solvent in condition for re-employment.

In place of the batchwise mode of operation just described, the invention is preferably practiced in continuous manner with apparatus such as those illustrated in Figs. 2 and 3. For instance, in the production of butadiene and sulphur dioxide from the corresponding sulphone with the apparatus of Fig. 2, the tower 1 is filled to overflowing with kerosene, or similar selective solvent, the valve in line 6 being closed and that in line 4 being open. While continuing the flow of kerosene, the liquefied sulphone is introduced through inlet 2 and spray head 3 whereby it is dispersed as droplets which shower downward through the kerosene. The mixture within the tower is maintained at a temperature sufficient to liquefy, but not decompose, the sulphone and at a pressure sufficient to prevent appreciable vapor formation. The temperature is usually between 65° and 120° C., preferably between 70° and 90° C., but by introducing the sulphone in admixture with any of a variety of agents capable of depressing its freezing point, lower temperatures, e. g. room temperature or only moderately above, may be used. Among the various agents which may be admixed with the sulphone to depress its freezing point are sulphur dioxide and solvents capable of dissolving the sulphone such as acetone, ethyl acetate, benzene, ortho-dichlorobenzene, etc. The sulphone is, of course, preferably introduced in substantially pure form, since the introduction of such diluents is not desirable and may detract from the advantages of the invention. The pressure on the mixture is usually 80 pounds per square inch or higher, preferably between 150 and 300 pounds per square inch. However, lower pressures may in some instances be used and the pressure may, of course, be as high as desired. The sulphone and kerosene are introduced at the desired pressure and advantageously at about the temperature desired in the tower.

After a layer of sulphone has accumulated at the bottom of tower 1, the valve in line 6 is opened sufficiently to permit its withdrawal at a rate corresponding approximately to that at which it is introduced. The relative flows of kerosene and butadiene are adjusted so that the sulphone phase withdrawn through outlet 6 is substantially free of kerosene, except for the small amount which is soluble therein and the kerosene phase withdrawn through outlet 4 is substantially free of sulphone. It may be mentioned that the relative rates of flow of the two liquids may be varied widely and yet obtain the operating conditions just given.

After establishing the foregoing conditions of temperature, pressure, and liquid flow, pump 8 is operated, whereby the suspension of sulphone in kerosene is withdrawn from tower 1 and caused to pass, preferably in turbulent flow, to the sulphone decomposer 10 wherein it is heated to a temperature of usually between 120° and 140° C. and sulphone is dissociated. From the sulphone decomposer, the mixture passes to a cooler 12, wherein the temperature is lowered to below 120° C. and preferably to about that of the mixture in tower 1. The mixture next flows to the settling tank 14, wherein any tarry matter is separated and withdrawn through outlet 15. The reaction mixture is returned from tank 14 through line 16 to tower 1.

By such operations, a portion of the sulphone is dissociated into butadiene and sulphur dioxide which are absorbed by the kerosene and unreacted sulphone, respectively, to form two distinct extracts that are immiscible, or only slightly soluble, in one another. The solution of butadiene and kerosene thus formed flows from tower 1 through the valved line 4 to the column 17 which is used to vaporize or distill butadiene from the solution through outlet 19. This separation is preferably effected by distillation under a pressure of about 40 pounds per square inch or higher, a portion of the distillate being returned as usual for purpose of reflux. The residual kerosene is cooled and returned to tower 1 for recycling in the process.

The solution of sulphur dioxide and sulphone is withdrawn from tower 1 through valved outlet 6 and sulphur dioxide is vaporized or distilled therefrom at a temperature below that at which the sulphone is decomposed. Although such distillation may be carried out under pressure, it is preferably accomplished at atmospheric pressure or thereabout and at a temperature below 120° C. and preferably below 100° C. The residual sulphone is cooled, if necessary, and recycled to tower 1.

By operating in such continuous manner, 90 per cent or more of the sulphone may readily be dissociated in a single pass through the sulphone decomposer and the resultant sulphur dioxide and butadiene are separated and collected in anhydrous form. The process may be operated to collect each of said products in a form of 95 per cent purity or higher.

Except for the mode of introducing the kerosene and sulphone, the practice in using the apparatus of Fig. 3 of the drawings is similar to that just described. The results obtained are also similar. The flows of the materials when using the apparatus of Fig. 3 are indicated in the drawings and do not require explanation. The apparatus arrangement of Fig. 3 is advantageous in that it provides for independent feeds of materials to the sulphone decomposer and to the extraction tower, thus rendering it quite simple to obtain the desired concentration of sulphone in each unit.

The process and apparatus herein described may be modified without departing from the invention. For instance, instead of vaporizing or distilling sulphur dioxide from its solution in the sulphone, the sulphur dioxide may be recovered in other known ways, e. g. by cooling the solution to crystallize the sulphone and filtering, decanting, or vaporizing the sulphur dioxide to remove it from the crystallized sulphone.

In place of kerosene and the sulphone of butadiene, other solvents and sulphones such as those hereinbefore mentioned may be used in the process.

Other modes of practicing the invention may be employed instead of those explained, change being made as regards the method herein disclosed, provided the step or steps stated by any of the following claims or the equivalent of such stated step or steps be employed.

I therefore particularly point out and distinctly claim as my invention:

1. In a method wherein a sulphone of a conjugated diolefin is thermally decomposed to form sulphur dioxide and the diolefin, the step which consists in carrying the reaction out in the presence of a selective solvent for the diolefin having relatively little solvent action for sulphur dioxide and at a pressure sufficient to liquefy the mixture.

2. In a method wherein a sulphone of a conjugated diolefin is thermally decomposed to form sulphur dioxide and the diolefin, the step which consists in carrying the reaction out in the presence of a normally liquid saturated hydrocarbon having a boiling point different from that of the diolefin and at a pressure sufficient to liquefy the mixture.

3. In a method wherein a sulphone of a conjugated diolefin is thermally decomposed to form sulphur dioxide and the diolefin, the step which consists in carrying the reaction out in the presence of a normally liquid paraffinic hydrocarbon, of boiling point higher than that of the diolefin, in amount corresponding to at least 0.5 of the weight of the sulphone reactant and at a pressure sufficient to liquefy the reaction mixture, whereby the diolefin product is absorbed, as it is formed, by the paraffinic hydrocarbon and is thereby separated in a liquid phase distinct from that containing the major portion of the sulphur dioxide product.

4. In a method wherein a sulphone of a conjugated diolefin is thermally decomposed to form sulphur dioxide and the diolefin, the steps which consist in heating the sulphone to the decomposition temperature in the presence of at least an equal weight of a liquid paraffinic hydrocarbon of boiling point higher than that of the diolefin product and at a pressure sufficient to liquefy the mixture, whereby the diolefin product is selectively absorbed by the paraffinic hydrocarbon leaving the major portion of the sulphur dioxide product in a phase distinct therefrom, separating the two liquid phases, and vaporizing the diolefin from its solution in the paraffinic hydrocarbon.

5. In a method wherein the sulphone of butadiene is thermally decomposed to form sulphur dioxide and butadiene, the steps which consist in heating the sulphone to the decomposition temperature in the presence of at least twice its weight of a normally liquid fraction of petroleum which is rich in paraffinic hydrocarbons and boils at temperatures above the boiling point of butadiene, whereby butadiene is selectively absorbed, as it is formed, by the petroleum fraction and is thereby brought into a liquid phase distinct from that containing unreacted sulphone and the major portion of the sulphur dioxide product, separating the two liquid phases, and vaporizing a reaction product from at least one of said phases.

6. In a method for the recovery of sulphur dioxide and a conjugated diolefin from a corresponding sulphone, the steps which consist in passing the liquefied sulphone and a normally liquid paraffinic hydrocarbon of boiling point above that of the diolefin into admixture with one another, passing the resultant mixture in turbulent flow through a heating zone wherein it is heated to a reaction temperature between 120° and 150° C. and the sulphone is thereby at least partially decomposed into sulphur dioxide and the diolefin, cooling the reaction mixture to a temperature below 120° C. and passing it into an extraction tower while introducing a normally liquid paraffinic hydrocarbon of boiling point above that of the diolefin to the tower near its lower end and introducing additional quantities of the liquefied sulphone near the top of the tower so that they pass through the tower in counterflow manner, continuously withdrawing the resultant solution of sulphur dioxide and the liquefied sulphone from the bottom of the tower and continuously withdrawing the solution of the diolefin and the normally liquid paraffinic hydrocarbon from the top of the tower, all of the foregoing operations being carried out under a pressure sufficient to liquefy the mixture, and thereafter vaporizing a reaction product from at least one of the solutions thus obtained.

7. In a method for recovering sulphur dioxide and butadiene from the corresponding sulphone, the steps which consist in passing a mixture of the sulphone and at least two times its weight of a normally liquid paraffinic fraction of petroleum in turbulent flow and at a pressure sufficient to liquefy the mixture through a heating zone wherein it is heated to a reaction temperature between 120° and 150° C. and the sulphone is at least partially decomposed into sulphur dioxide and butadiene, cooling the resultant liquefied mixture to a temperature below 120° C. and while maintaining it at a liquefying pressure introducing the mixture near the midsection of an extraction tower while introducing an additional quantity of the liquid petroleum fraction near the bottom of the tower and an additional quantity of the liquefied sulphone near the top of the tower in such manner as to cause said petroleum fraction and the liquefied sulphone to flow countercurrently through the tower, continuously withdrawing the resultant solution of sulphur dioxide and sulphone from the bottom of the tower and continuously withdrawing the solution of butadiene and the petroleum fraction from the top of the tower, and vaporizing a reaction product from at least one of the solutions thus obtained.

GEORGE M. HEBBARD.